United States Patent

Soma

Patent Number: 5,842,302
Date of Patent: Dec. 1, 1998

[54] FALSE BAIT

[75] Inventor: Katsuyuki Soma, Tokyo, Japan

[73] Assignee: Morio Arai, Saitama-ken, Japan

[21] Appl. No.: 811,904

[22] Filed: Mar. 5, 1997

[30] Foreign Application Priority Data

Sep. 27, 1995 [JP] Japan .................................... 7-273414

[51] Int. Cl.⁶ ................................................. A01K 85/18
[52] U.S. Cl. ........................................ 43/42.11; 43/42.15
[58] Field of Search ............................... 43/42.11, 42.13, 43/42.15, 42.35, 42.41, 42.5

[56] References Cited

U.S. PATENT DOCUMENTS 3,410,019  11/1968  Landi ..................................... 43/42.41
3,411,233  11/1968  Hopper ...................................... 43/37

FOREIGN PATENT DOCUMENTS 7-273414  9/1995  Japan .

Primary Examiner—Daniel D. Wasil
Attorney, Agent, or Firm—Notaro & Michalos, P.C.

[57] ABSTRACT

A false bait for copying complicated actions and water sounds of real bait, comprising a pair of bodies each having a head and a tail end. The bodies are loosely connected to each other at the head ends and the tail ends of the bodies. A hook is attached to one connection and a line to the other.

4 Claims, 4 Drawing Sheets

FALSE BAIT

FIELD OF THE INVENTION

The present invention relates to a false bait such as spoons and other lures for game fishing. That is, a false bait that gains movement in the water against the water especially when withdrawn so that it moves itself as if a bug, baby fish and other small things do and lures fish to catch.

PRIOR ART

A conventional false bait consists of a single body in a variety of shapes, to the head part of which a fishing line and to the tail part of which a hook are connected respectively. In other words, the body itself is always made of a single entity.

BACKGROUND OF THE INVENTION

A false bait aims at copying faithfully actions in accordance with an angler's skill and water flow of a real bait such as a bug or a baby fish that is a favorite of the subject fish. However, a conventional false bait can not copy complicated actions of a small creature and water sounds because of it consisting of a single body. In addition, due to its appearance as a make-believe for bait, it is limited in shape and weight and therefore concentrating the center of gravity is difficult and is inclined to be lighter than required. Thus, the swimming action of the false bait comes unstable and fling of the false bait comes powerless.

PURPOSE OF THE INVENTION

The subject invention is therefore directed to present a false bait that is suitable to copy faithfully complicated actions and water sounds of a real bug or baby fish that is a favorite for the game fish in accordance with the movement caused by an angler and water flow. Further, the false bait of the subject invention is not limited in terms of shape or weight for appearance sake and therefore its shape and weight being any desired one, the center of gravity can be easily focused, the swimming action can be stable and the fling of itself can be powerful.

STRUCTURE OF THE INVENTION

A false bait of the subject invention consists of a pair of bodies head parts and tail parts thereof being leisurely connected to each other respectively so that a fishing line and a hook is combined with the head part and the tail part respectively.

Another false bait of the subject invention consists of a pair of bodies, more than two parts of the head parts, the tail parts and the intermediate parts thereof being leisurely connected to each other respectively so that a fishing line is combined with either the head part or the intermediate part and hooks are combined with the rest of the parts.

Another false bait of the subject invention consists of a pair of bodies being shaped obtusely angled and connected to each other either leisurely or fixedly with the head parts and the tail parts crossing respectively so that a fishing line and a hook is combined with the head part and the tail part respectively.

PREFERRED EMBODIMENTS

Figure 1:
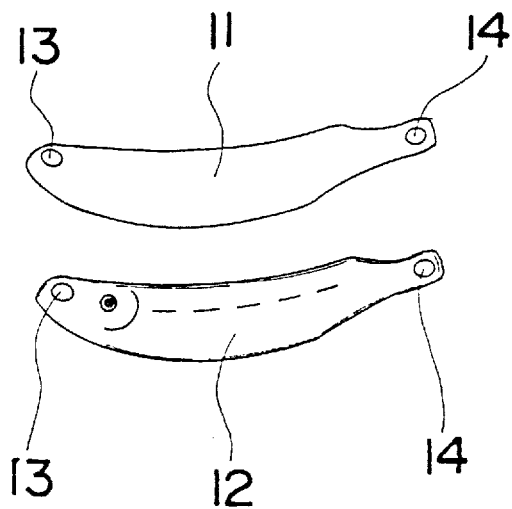
FIGS. 1–4 show a first embodiment of the false bait.
Figure 2:
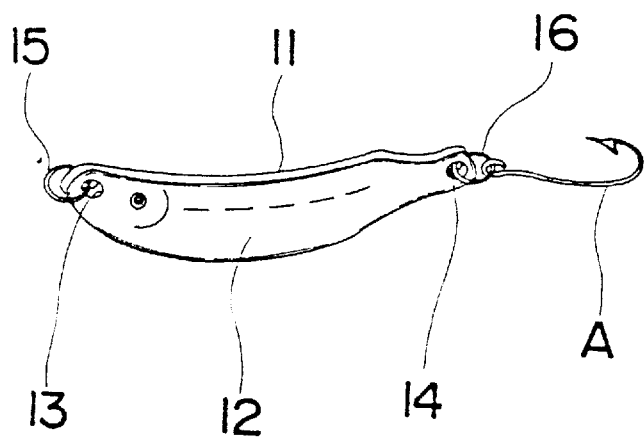
Figure 3:
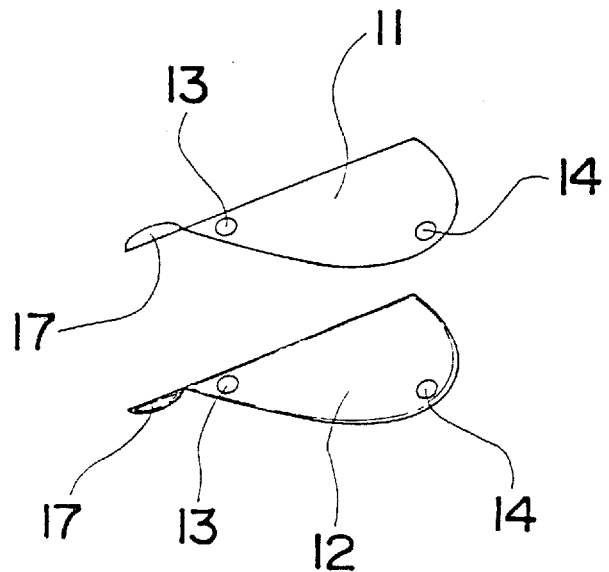
Figure 4:
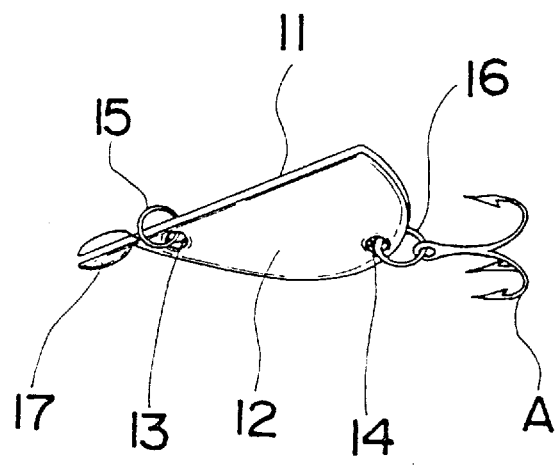

The first embodiment of the subject invention is shown in FIG. 1 and 2 (and 3 and 4) where a pair of bodies 11, 12 made of a flat and long plate into a generally similar shape to each other are combined leisurely with rings 15, 16 that pierce through holes 13, 13, 14, 14 made at head parts and tail parts of the bodies 11, 12. A fishing line is combined with the ring 15 of the head part and a hook is combined with the ring 16 of the tail part respectively.

Figure 5:
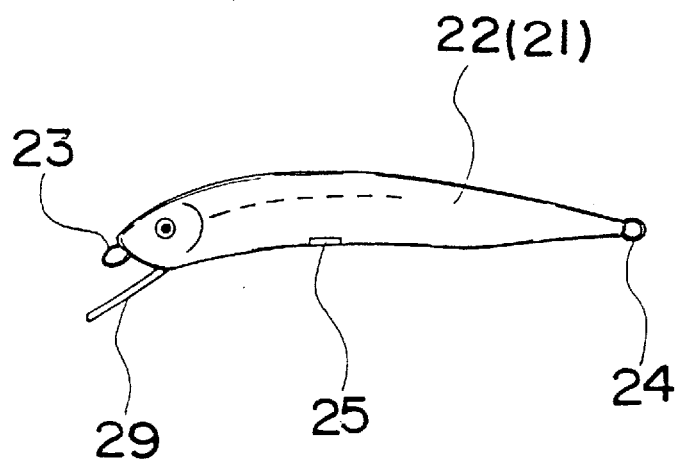
FIGS. 5–6 show a second embodiment of the false bait.
Figure 6:
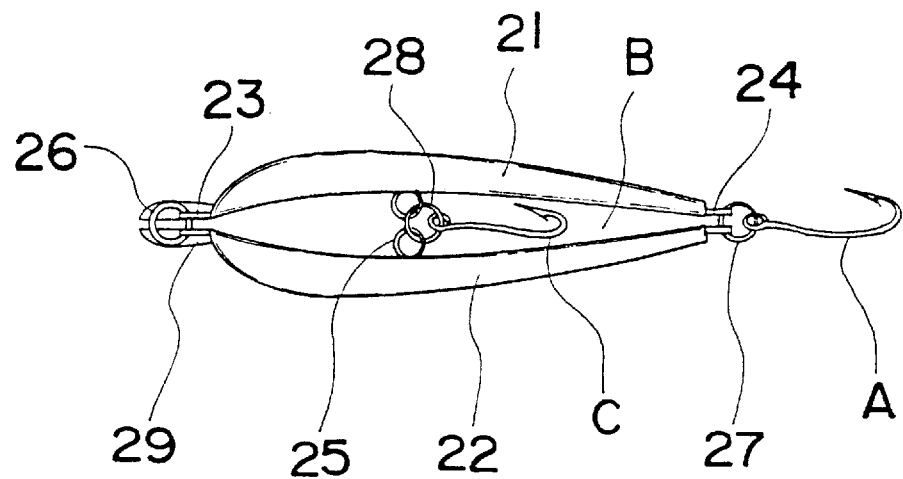

The second embodiment, as shown in FIG. 5 and 6, is a false bait, the bodies 21, 22 of which are combined leisurely to each other at two or more than two points with the head part, the tail part and one or two or more than two points of the intermediate part therebetween. Rings 23, 23, 24, 24 are attached to the head parts and the tail parts of the bodies 21, 22 and moreover, a ring 26 is combined with the rings 23, 23 and a ring 27 is combined with the rings 24, 24. A fishing line (not shown) is combined with the ring 26 and a hook A is combined with the ring 27 to form a meeting area B in between the bodies 21 and 22. Moreover, rings 25, 25 are attached at one point of the intermediate part of the bodies 21, 22 respectively and with the rings 25, 25, a ring 28 is combined with which, in turn, another hook C is combined. Cipher 29 represents lips. In addition to the embodiment as shown in the drawings, another embodiment consists of the bodies 21, 22 being made of flexible material and with the intermediate part thereof a fishing line is combined and with the rest of the parts hooks are combined.

Figure 7:
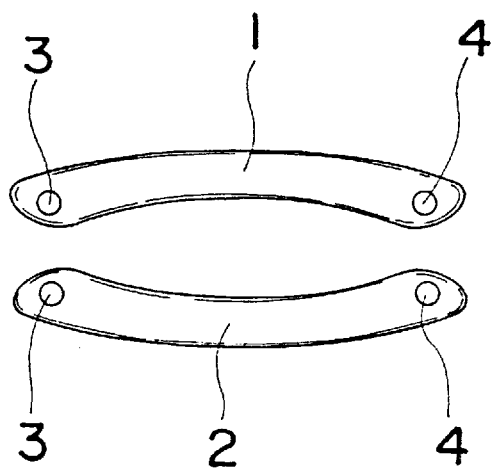
FIGS. 7–9 show a third embodiment of the false bait.
Figure 8:
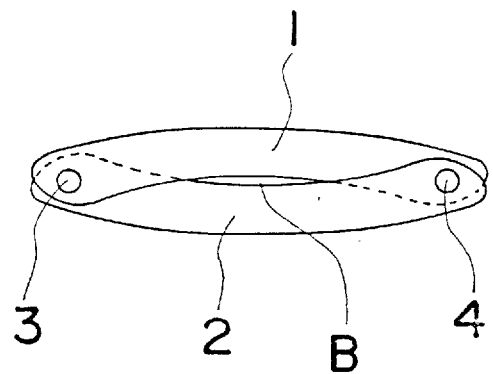
Figure 9:
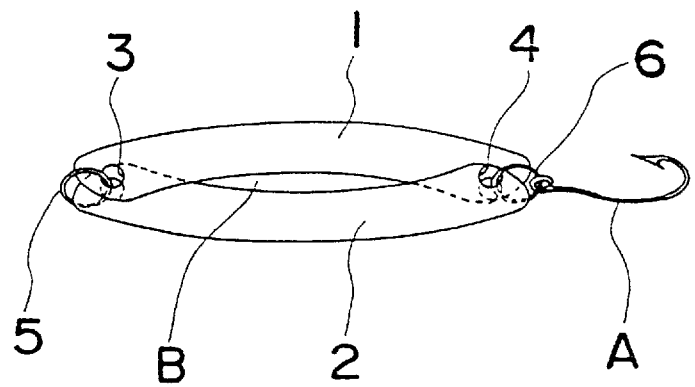

The third embodiment, as shown in FIG. 7, 8 and 9, is a false bait, a pair of the bodies 1, 2 being shaped obtusely angled and the head parts and the tail parts of the bodies 1, 2 being crossed and met with each other and through holes 3, 3, 4, 4 made at the head parts and tail parts of the bodies 1, 2, rings 5, 6 are combined to connect the bodies 1, 2 leisurely so that a fishing line is combined with the ring 5 at the head part and a hook A with the ring 6 at the tail part. In this embodiment, a meeting area B is formed in between the bodies 1, 2. Either one of both of the head parts and the tail parts may either be fixed or leisurely connected to each other.

Effects of the Invention

Because the head parts and the tail parts of a pair of bodies of the first embodiment are leisurely connected to each other, the meeting area formed between the bodies repeats opening and shutting movements when they are drawn by an angler against the water flow or when flung and fallen into the water. This opening and shutting movement can be manipulated any manner as an angler draw quickly and slowly the false bait. As it opens and shuts in compliance with the water flow, it makes sounds in the flow. All of these lures game fish in the water.

The second embodiment consisting of a pair of bodies combined leisurely at more than two points with the head parts, tail parts or intermediate parts so that a fishing line is combined with the head part or the intermediate part and hooks are combined with the rest of the parts, in addition to the advantages mentioned above, facilitates a fishing by decoy like in trout fishing.

The third embodiment consisting of a pair of obtusely angled bodies being crossed and met at the head parts and tail parts with each other so that a fishing line is combined with the head part and a hook is combined with the tail part, when the bodies are connected leisurely at both parts, it entertain all the advantages attained by said first embodiment and further, even more complicated movements are attained because the bodies revolve and sounds occur in the revolving. When they are combined fixedly, said opening and shutting movements can not attained, however, said revolving movement and the water sounds are attained and further, when they are combined partially fixed and partially leisured, then some intermediate effects are attained.

What is claimed is:

1. A false bait comprising:

a pair of bodies each having a head end and a tail end, means for loosely connecting the head ends of the bodies to each other for permitting relative movement between the head ends of the pair of bodies, means for connecting the tail ends loosely to each other for permitting relative movement between the tail ends of the pair of bodies, means for attaching a hook to the pair of bodies and means for attaching a line to the pair of bodies.

2. A false bait according to claim 1 including means for loosely attaching the pair of bodies to each other at a location intermediate the head and tail ends of the bodies, the hook being connected to one of the means for attaching the tail ends and intermediate portions to each other and the means for attaching the line being connected to the means for loosely attaching the head ends of the pair of bodies.

3. A false bait according to claim 1, wherein said means for loosely connecting the head ends comprises a first ring and said means for loosely connecting the tail ends comprises a second ring.

4. A false bait according to claim 3, wherein the means for attaching a hook comprises said second ring and said means for attaching a line comprises said first ring.

* * * * *